(12) United States Patent
Koitabashi et al.

(10) Patent No.: US 6,471,757 B1
(45) Date of Patent: *Oct. 29, 2002

(54) INK, INK CONTAINER, INK SET, INK JET PRINTING APPARATUS, AND INK JET PRINTING METHOD

(75) Inventors: Noribumi Koitabashi, Yokohama; Yoshihisa Takizawa, Machida; Yutaka Kurabayashi, Higashimurayama; Takeo Eguchi, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,631

(22) Filed: Oct. 26, 1998

(30) Foreign Application Priority Data

Oct. 30, 1997 (JP) ............................................. 9-312869
Dec. 26, 1997 (JP) ............................................. 9-361461
Dec. 26, 1997 (JP) ............................................. 9-361462

(51) Int. Cl.[7] .......................... C09D 11/00; C09D 11/02
(52) U.S. Cl. .............................. 106/31.28; 106/31.52; 106/31.65; 106/31.75; 106/31.86; 106/476
(58) Field of Search .......................... 106/31.28, 31.52, 106/31.65, 31.75, 31.86, 476

(56) References Cited

U.S. PATENT DOCUMENTS

| | | | |
|---|---|---|---|
| 5,124,201 A | 6/1992 | Kurabayashi et al. | 428/323 |
| 5,356,464 A | 10/1994 | Hickman et al. | 106/20 R |
| 5,526,031 A | 6/1996 | Kurabayashi | 347/105 |
| 5,571,311 A | 11/1996 | Belmont et al. | 106/20 R |
| 5,630,868 A * | 5/1997 | Belmont et al. | 106/476 |
| 5,672,198 A | 9/1997 | Belmont | 106/20 R |
| 5,718,746 A * | 2/1998 | Nagasawa et al. | 106/31.65 |
| 5,746,818 A | 5/1998 | Yatake | 106/31.86 |
| 5,762,695 A | 6/1998 | Wong et al. | 106/31.89 |
| 5,835,116 A | 11/1998 | Sato et al. | 347/98 |
| 5,846,307 A * | 12/1998 | Nagasawa et al. | 106/31.65 |
| 5,853,465 A * | 12/1998 | Tsang et al. | 106/31.86 |
| 5,879,439 A * | 3/1999 | Nagai et al. | 106/31.28 |
| 5,985,015 A * | 11/1999 | Kanaya | 106/31.86 |

FOREIGN PATENT DOCUMENTS

| | | |
|---|---|---|
| EP | 0 098 338 A1 | 1/1984 |
| EP | 0 136 095 A2 | 4/1985 |
| EP | 0 583 096 A1 | 2/1994 |
| EP | 0 732 382 A1 | 9/1996 |
| EP | 0 761 782 A2 | 3/1997 |
| EP | 0 943 666 A2 | 9/1999 |
| JP | 2-276873 | 11/1990 |
| JP | 5-179183 | 7/1993 |
| JP | 6-88048 | 3/1994 |
| JP | 7-53841 | 2/1995 |
| WO | WO 96/18695 | 6/1996 |
| WO | WO 96/18696 | 6/1996 |

OTHER PUBLICATIONS

Registry file search on the term "Surfynol" in CAS, 3 pages. no date available.*

* cited by examiner

Primary Examiner—Helene Klemanski
(74) Attorney, Agent, or Firm—Fitzpatrick, Cella, Harper & Scinto

(57) ABSTRACT

An ink of the present invention has a dye and a pigment. The pigment is a self-dispersant type pigment and an anionic dye in which at least one anionic group is bound on a surface of the pigment directly or through another atomic group and having a Ka value of less than 1 ml·m$^{-2}$·msec$^{-\frac{1}{2}}$ according to a Bristow method. An image having an excellent image quality is formed by using such an ink in the process of ink jet recording.

48 Claims, 6 Drawing Sheets

INK, INK CONTAINER, INK SET, INK JET PRINTING APPARATUS, AND INK JET PRINTING METHOD

This application is based on Patent Application Nos. 312869/1997 filed on Oct. 30, 1997 in Japan, 361461/1997 filed on Dec. 26, 1997 in Japan and 361462/1997 filed on Dec. 26, 1997 in Japan, the content of which is incorporated hereinto by reference.

1. Field of the Invention

The present invention relates to an ink, especially an ink used in the process of ink jet printing and to an ink jet printing method. The present invention also relates to an ink container, an ink set, and an ink jet printing apparatus. The present invention can be applied to all of the devices such as printers, facsimile machines, and copying machines, which are able to print on various kinds of printing mediums such as paper, fabric, leather, non-woven fabric, and plastic sheets (e.g., OHP sheet).

2. Description of the Related Art

An ink jet printing method has been used in a broad range of printers, copying machines, and so on because of its various advantages including: low noise generation, low running cost, high-speed printing, size reduction, and output in multiple colors. Each of such printing and copying machines makes a choice among different types of inks generally in terms of: ink-discharging properties, printing properties including fixation of ink, bleeding and reflection density of print image, and print qualities including color development.

By the way, it is well known that those inks can be broadly divided into two groups, i.e., dye inks and pigment inks in terms of coloring materials contained in the respective inks. The pigment inks are superior to the dye inks in water resistance, light stability, and ability to provide excellent character qualities such as sharp outline of characters.

One of the examples of pigment inks that contain a pigment dispersant (hereinafter, referred as a dispersant-containing pigment ink) is disclosed in, for example, Japanese Patent Application Laid-open Nos. 179183/1993 and 53841/1995. The former discloses a pigment ink in which a pigment is dispersed by a block polymer of "AB" or "BAB" type, and the latter discloses another pigment ink in which a pigment is dispersed by a tri-block polymer of "ABC" type.

Furthermore, a self-dispersing type pigment ink (hereinafter, referred as a dispersant-less pigment ink) which does not need to use any dispersants such as the block polymer described above to disperse the pigment is also known. For example, International patent application Nos. WO96/18695 and WO96/18696, disclose pigment inks in which carbon blacks to whose surfaces hydrophilic groups are directly bound, are dispersed.

In case of applying either types of the pigment inks, i.e. the dispersant-containing pigment ink and the dispersant-less pigment ink, onto a printing medium, pigments in the ink are agglomerated on a surface of the printing medium, and form an image dot. Thus, the coloring material, i.e. pigments, are put on the surface of the printing medium. That is to say, almost all the coloring materials in the ink tend to remained on the surface of the printing medium. Hereinafter, ink providing this kind of image dot, is called "top-loading type" ink.

On the other hand, in order to improve the printed image's color characteristics, the present inventors made an invention in which so called super-penetration type ink, i.e. an ink which penetrates into the inside of a printing medium extremely well, is employed. In the invention, the super-penetration type ink's penetration into the printing medium in its thickness direction is accelerated and the super-penetration type ink is allowed to spread in the printing medium (see European Patent Application No. EP 583096 A, or Japanese Patent Application Laid-open No. 88048/1994).

BACKGROUND OF THE INVENTION

In view of the aforementioned prior art, the present inventors focused on the dot shape including the dot density's uniformity, the outer shape of the dot, and the diameter of the dot etc., and have obtained the following findings. FIGS. 7A to 7G are schematic plain views of image dots obtained by applying various types of inks to the same printing medium under same conditions.

FIG. 7A is an image dot having a diameter of RA formed with a dispersant containing ink, and FIG. 7B is an image dot having a diameter of RB formed with a dispersant-less ink. The diameter RB was slightly larger than RA. Each of the image dots had unified density throughout the respective image dots. Further, substantial feathering could not be seen in both the image dots, thus any problems could not be found in the outer shapes of the respective dots. Regarding the image dot's diameter, however, the inventors found the fact that the respective image dots'diameters were slightly smaller than those expected from a shape of respective ink droplets. The reason is believed to be that the image formation by the pigment ink owes to pigments' agglomeration on the printing medium. To sum up, the pigment ink provides an image dot whose density is unified and has a good outer shape, but the ink droplet seems not to be spread easily on the printing medium. Therefore, regarding ink jet recording process with the pigment ink, the present inventors recognized that the known pigment ink should be modified in order to form an image dot having larger area-factor, i.e. a ratio of an area covered with an image dot to the unit area.

Based on the aforementioned recognition, the inventors modified the conventional pigment inks so as to have better penetration by utilizing the technology of the super-penetration type ink. As a result of the experiment, a change in pigments agglomeration could be observed, and the outer shape of an image dot was changed. As shown in FIGS. 7C and 7D, the diameter of RC and RD of the respective image dots became larger than the diameter of RA and RB. That is, the relation between RA, RB, RC and RD are as follows: RA<RB<RC<RD.

As shown in FIG. 7C, however, a modified dispersant-containing pigment ink whose penetrability was better than that of the conventional dispersant-containing pigment ink, provided an image dot having feathering 701 extending from the center of the image dot towards the outside thereof. In addition, a modified dispersant-less pigment ink having better penetrability than that of the conventional dispersant-less pigment ink, provided an image dot having a circumferential area (hazy area) 703 around the core area 704 in addition to feathering 701. In the circumferential area 703, fine particles of the pigment in the ink were diffused and the density of the circumferential area 703 became lower than that in the core area 704. That is, the density in the image dot was apparently different in its circumferential area 703 and its core area 704.

In accordance with the findings shown in FIGS. 7C and 7D, the present inventors conducted a further experiment regarding image dots formed with two types of further modified pigment inks, one of which was a dispersant-containing pigment ink containing a dye and having better penetrability than that of the conventional dispersant-containing ink, and the other was a dispersant-less pigment ink containing a dye and having better penetrability than that of the conventional dispersant-less pigment ink. The resultant image dots with the respective further modified pigment inks are shown in FIGS. 7E and 7F. The respective image dots have diameters of RE and RF both of which were much larger than RA–RD, and RF is larger than RE. As shown in FIG. 7E, however, the ink dot had a circumferential area 705 around a core area 706, the circumferential area 705 having lower density than that of the core area 706, which was not observed in the image dot shown in FIG. 7C. The circumferential area 705 seems to be made due to separation of the dye and the pigment on the printing medium, and the separated dye's diffusion, and the core area seems to contain agglomerated pigment. Thus, the difference in density in the image dot became conspicuous.

Furthermore, as shown in FIG. 7F, the ink dot had a circumferential area 707 in which the dye was mixed and diffused in the circumferential area 703 of the image dot shown in FIG. 7D.

Apart from the aforementioned issue regarding the dot shape, the present inventors also found that the conventional pigment ink gave an image lack of uniformity in the pigment fixation resulting from an acute agglomeration of the pigment on the printing medium when the printing medium had poor ink absorbency.

Further, in the case that the strength of the acute agglomeration was relatively strong, not only the non-uniform agglomeration of the pigment but also cracks where no coloring material existed were sometimes observed in the image dot.

FIG. 1 is a schematic view for explaining the cracks. As one can see therefrom, the size of the crack is relatively large and conspicuous. Thus the cracks make the quality of the printed image get worse. In addition to that, the cracks may decrease optical density (O.D.) of the image dot since the surface of the printing medium is exposed at the cracks. This kind of crack is observed when the conventional pigment ink is applied to a printing medium having a top-coat layer for receiving the ink, i.e. a resin layer, like a transparency for over head projector (OHP) etc., because the agglomeration of the pigment on the resin is affected by materials in the resin layer. In particular, in the case of applying an anionic pigment ink to the printing member provided with a resin layer containing a cationic substance, the pigment agglomeration occurs drastically on the resin layer.

The issue about the agglomeration which causes the cracks is conspicuous when the conventional pigment ink is employed, but the present inventors confirmed that the cracks occurred in an image dot formed with an ink containing a dye, a pigment and a dispersant for the pigment disclosed in Japanese Patent Application Laid-open No. 276873/1990 which was for by the present applicant.

SUMMARY OF THE INVENTION

The present invention is completed in view of the technical problems for providing the more excellent quality of image formed by the use of an ink-jet printing method, which are additional problems being found as a result of careful consideration on the related art as described above.

An object of the present invention is to provide an ink capable of providing an excellent image dot in its shape, i.e. an ink dot spread on a printing medium properly and having an appropriate diameter in terms of an ink droplet applied to the printing medium, having uniform density in the dot, being free from or substantially free from any feathering in the circumferential area, and having a good outer shape.

Another object of the present invention is to provide an ink capable of reducing unevenness of a printed image due to pigment's agglomeration, and deterioration of a printed image's quality caused by cracks.

A further object of the present invention is to provide an ink jet printing process capable of forming a high quality image with enough density and reducing quantity of an ink applied to a printing medium.

Still another object of the present invention is to provide an ink jet printing process capable of forming a high quality image with no cracks or substantially no cracks on a printing medium having poor ink absorbency.

A still further object of the present invention is to provide an ink jet recording apparatus capable of recording a high quality image on a printing medium stably.

A still further object of the present invention is to provide an ink cartridge and an ink tank for an ink jet recording apparatus capable of recording a high quality image.

According to a first aspect of the present invention, there is provided an ink containing an anionic dye and a self-dispersant type pigment wherein an anionic group is bonded to a surface of the pigment, the anionic group being bound to the pigment's surface directly or through an atomic group, wherein the ink has Ka value of less than 1 ml·m$^{-2}$·msec$^{-\frac{1}{2}}$ according to the Bristow method.

According to another aspect of the present invention, there is provided an ink for use in an ink jet image forming process, the ink being ejected from an orifice by an ink jet ejecting process, comprising an anionic dye and a self dispersant type pigment wherein an anionic group is bonded to a surface of the pigment, the anionic group being bound to the pigment's surface directly or through an atomic group, wherein the ink has a Ka value of less than 1 ml·m$^{-2}$·msec$^{-\frac{1}{2}}$ according to the Bristow method.

The respective inks can provide image dots having larger diameters than those of dots formed with conventional "top-loading type" pigment inks, i.e. a dispersant-containing pigment ink and a dispersant-less pigment ink. As shown in FIG. 7G, the relation among the dot diameter RG, RA and RB was as follows: RA<RB<RG. Using the present inks, it is possible to form an image having enough density on a certain printing medium which tends to be difficult to have a high quality image formed thereon without increasing the quantity of the ink to be applied. In addition, when compared with an ink dot formed with a modified conventional pigment ink having better penetrability, the present image dot tends to be smaller than the diameter RD. However, the present dot has more uniform density and higher optical density, and feathering cannot be seen around the dot. That is, as shown in FIG. 7G, a hazy area 703 in FIG. 7D or unevenness in image density between a core area and a circumferential area admitted in FIGS. 7E and 7F cannot be seen in the present dot.

The reason why the present inks accomplish these technical advantages is not clear at present, but it is believed that the dye in the present inks interferes with the agglomeration of the self-dispersant type pigment, and the interference prevents the self-dispersant type pigment from agglomerating too much, but allows the self-dispersant type pigment's agglomeration, and the dye and the pigment are distributed uniformly as if the dye and the pigment unified as one body to form the image dot.

Therefore, regarding dot diameter, the present ink provides image dots having larger diameter than those of dots formed with inks containing only pigments as shown in FIGS. 7A and 7B, and regarding image density, the present ink provides an image dot having highly uniform density and no hazy area because of restriction of spreading fine particles in the ink, such as a dye and a pigment in comparison with inks having better penetration as shown in FIGS. 7C and 7D.

Whatever the mechanism of the present invention, in the case that the present ink containing a self-dispersant type pigment and dye is employed for an ink jet printing, the pigment agglomeration becomes weaker, and the dye moderates the pigment's agglomeration, thus the pigment's agglomerated form seems to become a fine particle. In addition, the fine particle of the agglomerated pigment is surrounded by the dye. Then in the resulting printed image, unevenness due to the strong pigment's agglomeration is resolved.

According to another aspect of the present invention, there is provided an ink-jet printing process comprising the steps of:

i) ejecting an ink by ink jet recording process; and ii) applying the ink on a recording medium, wherein the ink contains an anionic dye and a self-dispersant type pigment wherein an anionic group is bonded to a surface of the pigment, the anionic group being bound to the pigment's surface directly or through an atomic group, and wherein the ink has a Ka value of less than 1 $ml \cdot m^{-2} \cdot msec^{-\frac{1}{2}}$ according to the Bristow method.

According to a further aspect of the present invention, there is provided an ink jet printing process comprising the steps of:

i) ejecting the ink towards a coated layer constituting an outer surface of a recording medium by a ink jet ejecting process; and ii) forming an image on the outer surface of the recording medium, wherein the ink contains an anionic dye and a self-dispersant type pigment wherein an anionic group is bonded to a surface of the pigment, the anionic group being bound to the pigment's surface directly or through an atomic group, and wherein the ink has a Ka value of less than 1 $ml \cdot m^{-2} \cdot msec^{-\frac{1}{2}}$ according to the Bristow method.

According to each of the above aspects of the present ink jet printing processes, it is possible to form an image dot having a larger diameter than those of image dots formed with conventional "top-loading type" pigment inks, thus it is possible to increase the area factor and to form an image dot having much higher density without increasing the quantity of an ink on a printing medium. Further, the present process provides an image dot having extremely even density compared to dots formed with modified inks which the present inventors studied, i.e. a super-penetration type pigment ink and a super-penetration type dye ink. Therefore, much higher quality images can be obtained.

Furthermore, according to each aspect of the present ink jet printing process, even if an image dot is formed on a printing medium whose ink absorbency is poor, cracks cannot be seen in the dot, and density thereof is high. The reason why such an advantage can be obtained is not clear at present. As mentioned above, it is believed that the degree of the pigment's agglomeration in an ink containing self-dispersant type pigment and not containing any dispersants such as a polymer, is relatively weak, and the dye in the present ink interferes with the self-dispersant type pigment's agglomeration, thus it is difficult for the pigment to form a relatively large size of agglomerated pigment on the printing medium. As the result of that, it is possible to reduce the occurrence of the cracks.

According to a still further aspect of the present invention, there is provided an ink tank containing an ink, wherein the ink contains an anionic dye and a self-dispersant type pigment wherein an anionic group is bonded to a surface of the pigment, the anionic group being bound to the pigment's surface directly or through an atomic group, and wherein the ink has a Ka value of less than 1 $ml \cdot m^{-2} \cdot msec^{-\frac{1}{2}}$ according to the Bristow method.

According to a still further aspect of the present invention, there is provided an ink set comprising a black ink, and at least one color ink selected from a yellow ink, a magenta ink and a cyan ink, wherein the black ink contains an anionic dye and a self-dispersant type carbon black wherein an anionic group is bonded to a surface of the carbon black, the anionic group being bound to the carbon black's surface directly or through an atomic group, and wherein the ink has a Ka value of less than 1 $ml \cdot m^{-2} \cdot msec^{-\frac{1}{2}}$ according to the Bristow method.

According to a still further aspect of the present invention, there is provided an ink jet recording apparatus comprising four ink containers, each of which contains a black ink, an yellow ink, a magenta ink or a cyan ink, and means for ejecting the respective inks independently by an ink jet ejecting process, wherein the black ink contains an anionic dye and a self-dispersant type carbon black wherein an anionic group is bonded to a surface of the carbon black, the anionic group being bound to the carbon black's surface directly or through an atomic group, and wherein the ink has a Ka value of less than 1 $ml \cdot m^{-2} \cdot msec^{-\frac{1}{2}}$ according to the Bristow method.

According to these aspects of the present invention, a much higher quality ink-jetted printed image in comparison with the conventional art may be provided.

The above and other objects, effects, features and advantages of the present invention will become more apparent from the following description of embodiments thereof taken in conjunction with the accompanying drawings.

BRIEF DESCRIPTION OF THE DRAWINGS

FIGS. 2A and 2B are schematic diagrams of a part of a dot image printed by using an ink of a first embodiment of the present invention;

FIGS. 7A to 7G are schematic diagrams for illustrating dot images formed on a printing medium when each of the dots is printed on the same printing medium under the same conditions using an ink jet printing method using various kinds of inks, in which FIG. 7A depicts a dot of top-loading-type dispersant-containing pigment ink;

FIG. 7B depicts a dot of top-loading-type dispersant-less pigment ink;

FIG. 7C depicts a dot of ultra-penetration-type dispersant-containing pigment ink;

FIG. 7D depicts a dot of super-penetration-type dispersant-containing pigment ink;

FIG. 7E depicts a dot of super-penetration-type dye and dispersant-containing pigment ink;

FIG. 7F depicts a dot of super-penetration-type dye and dispersant-less pigment ink; and FIG. 7G depicts a dot of top-loading-type dispersant-less pigment ink.

DETAILED DESCRIPTION OF THE PREFERRED EMBODIMENTS

Figure 1:
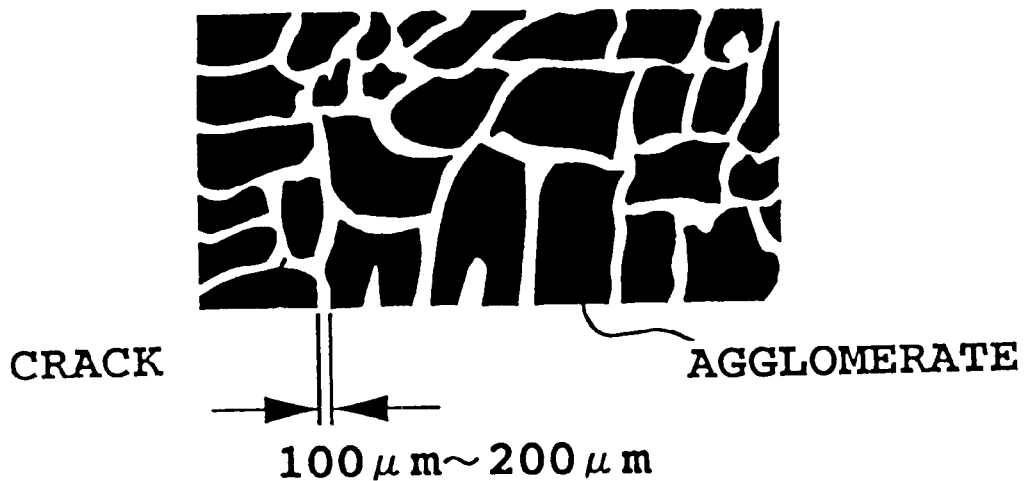
FIG. 1 is a schematic diagram of the "crack" portion of a dot image printed by using a pigment ink as one of the problems to be solved by the present invention.

According to the present invention, we are now describing an ink as one of the preferred embodiments for attaining the objects of the present invention.

One of the inks to be used in the present invention comprising self-dispersant type pigment and anionic dye in which one anionic group is bound on a surface of the pigment directly or through another atomic group and having a Ka value of less than 1 ml·m$^{-2}$·msec$^{-1/2}$ according to a Bristow method.

More details of such an ink will be described below.

The self-dispersant type pigment means the pigment characterized by maintaining a stable diffused condition in an aqueous solution such as water, aqueous organic solvent, or mixture thereof without using a dispersant such as a water-soluble polymeric compound, without undergoing any agglomeration among pigment particles in the aqueous solution, where the agglomeration prevents normal ink ejection from orifices of ink-ejecting means using an ink jet printing technology. As mentioned above, such an ink comprises a self-dispersant type pigment and an anionic dye in which one anionic group is bound on a surface of the pigment directly or through another atomic group. To be more specific, for example, the ink contains carbon black on which at least one anionic group is bound directly or through another atomic group. The anionic group bound on the carbon black can be selected from, for example, —COOM, —SO$_3$M, —PO$_3$HM, —PO$_3$M$_2$, —SO$_2$NH$_2$, —SO$_2$NHCOR, and so on, where M is hydrogen atom, alkali metal, ammonium, or organic ammonium; R is a straight-chain or branched-chain alkyl group with 1 to 12 carbons, substituted or unsubstituted phenyl group, or substituted or unsubstituted naphthyl group. If the R is a substituted phenyl group or substituted naphthyl group, a substituent may be a straight-chain or branched-chain alkyl group with 1 to 6 carbons or the like.

The alkali metal for the above "M" is, for example, lithium, sodium, potassium, or the like. The organic ammonium for the above "M" is, for example, mono-, di-, or tri-methylammonium, mono-, di-, or tri-ethylammonium, mono-, di-, or tri-methanolammonium or the like.

Among these anionic groups, especially —COOM and —SO$_3$M are preferable because of their properties of producing an effect of stabilizing a dispersed condition of carbon black.

Among the various kinds of anionic groups described above, it is preferable to use any of them which are bound to a surface of the carbon black through another atomic group. The atomic group may be substituted or unsubstituted alkylene group having 1 to 12 carbon atoms, substituted or unsubstituted phenylene group, or substituted or unsubstituted naphthylene group. The substituent which may be bound to the phenylene group or the naphthylene group is a straight-chain or branched-chain alkyl group with 1 to 6 carbons or the like.

Concrete examples of the anionic group for binding to a surface of carbon black through another atomic group include —C$_2$H$_4$COOM, —PhSO$_3$M, —PhCOOM, and so on, where Ph stands for phenyl group. However, the present invention is not limited to these groups.

The carbon black described above, on which an anionic group is bound directly or through another atomic group, can be prepared by the following process.

One process for introducing —COONa onto a surface of the carbon black may be the process including the step of oxidation treatment on commercially available carbon black with sodium hypochlorite.

Also, the process for binding —Ar—COONa group (where Ar stands for aryl group) on a surface of the carbon black may be the process including the step of reacting NH$_2$—Ar—COONa group with nitrous acid to produce diazonium salts followed by binding to the surface of the carbon black. However, the present invention is not limited to such processes.

It is preferable that 80% or more of the self-dispersant pigment in the ink has a diameter of from 0.05 to 0.3 μm, more preferably of from 0.1 to 0.25 μm. A process for forming such an ink is described in Examples of the present invention.

Anionic dyes which can be preferably used in the present embodiment include well-known acidic dye, direct dye, and reactive dye. Especially, the dye having a disazo- or trisazo-structure as a skeletal structure thereof is more preferable. In addition, it is also preferable to use two or more different dye compositions with different skeletal structures. In addition to black dye, another dye to be used may be cyan, magenta, and yellow within the bounds of predetermined gradations. The self-dispersing type carbon black is used as black pigment and as a color material for black ink.

The ink of the present embodiment is not limited to the types (colors) of dye and pigment. For a preferable form of the present embodiment, the ink of the present embodiment may be used as a black ink because a gain in OD for printing letters and characters is desired.

The amount of a color material as a mixture of pigment and dye is 0.1 to 15%, or preferably 1 to 10%, by weight on the basis of the total volume of ink. The ratio of the dye to the pigment (i.e., dye/pigment) is 5/95 to 95/5, preferably 10/90 to 90/10. More preferably, the ratio of dye/pigment for a printing medium having a resin-coating layer is 9/1 to 4/6, or preferably in the range wherein the dye occupies more than the pigment as much as possible. For ordinary paper, the ratio of dye/pigment is preferably in the range of 5/95 to 6/4.

Solvents useful for the above pigments and dyes are aqueous organic solvents including:

alkyl alcohol with 1 to 5 carbons, such as methyl alcohol, ethyl alcohol, n-propyl alcohol, isopropyl alcohol, n-butyl alcohol, sec-butyl alcohol, tert-butyl alcohol, isobutyl alcohol, and n-pentanol;

amide such as dimethylformamide and dimethylacetamide;

ketone or ketoalcohol such as acetone and diacetone alcohol;

ether such as tetrahydrofuran and dioxane;

oxyethylene or oxypropylene copolymer such as diethylene glycol, triethylene glycol, tetraethylene glycol, dipropylene glycol, tripropylene glycol, polyethylene glycol, and polypropylene glycol;

alkylene glycol with alkylene group having 2 to 6 carbons, such as ethylene glycol, propylene glycol, trimethylene glycol, triethylene glycol, and 1,2,6-hexanetriol;

glycerine;

lower alkylether such as ethylene glycol monomethyl (or ethyl) ether, and triethylene glycol monomethyl (or ethyl) ether;

lower dialkylamine of polyvalent alchol, such as triethylene glycol dimethyl (or ethyl) ether, and tetraethylene glycol dimethyl (or ethyl) ether;

alkanolamine such as monoethanol amine, diethanol amine, and triethanol amine; and sulfolane, N-methyl-2-pyrrolidone, 2-pyrrolidone, and 1,3-dimethyl-2-imidazolidinone.

Any of these aqueous organic solvents can be used by itself or in conjunction with at least one of the others.

The ink of the present embodiment, which contains various constituents as described above, provides an image dot with a substantially uniform concentration when attention is directed toward the permeability of ink to a printing medium and the value of Ka is adjusted to, for example, less than 1 ml·m$^{-2}$·msec$^{-1/2}$. Thus, the permeability of ink to the printing medium will be described below.

If the permeability of ink is represented by the volume of ink per square meter, it is known that the following Bristow equation represents the permeated volume (V (ml/m$^2$=$\mu$m)) of ink into a printing medium by the time (t) elapsed from the ejection of ink droplet.

$$V = Vr + Ka(t-tw)^{1/2}$$

wherein t>tw

At the instant following that an ink droplet falls on a surface of the printing medium, the ink droplet is substantially absorbed by microscopic asperities on the surface (i.e., rough surface) of the printing medium, so that a negligible amount of ink reaches to the interior of the printing medium. Thus, tw denotes the wet time and Vr denotes the volume of ink absorbed in the microscopic asperities on the surface during the period of tw. Subsequently, the ink passes through the surface of the printing medium and reaches thereto, so that the permeated volume V of the ink increases so as to be proportional to the ½th power of the time (t−tw) exceeded from the above elapsed time tw. In the equation, Ka stands for a proportional factor which takes on values depending on the rate of permeation.

The Ka value was measured by a liquid dynamic permeability testing device S (Toyo Seiki Seisakusho, JAPAN) using the Bristow method. In this experiment, PB paper available from the present applicant (i.e., CANON Kabushiki Kaisha) is used as a printing medium (printing paper), which can be used in both an ink jet printing apparatus and an apparatus for electrophotographic reproduction such as a copying machine or LBP. It is noted that the same results can be attained by using PPC paper which is for electrophotographic reproduction. Furthermore, the Ka value varies depending on the additional amount, type, and so on, of a surface active agent. For example, the permeability can be increased by adding an appropriate amount of non-ionic surface active agent such as ethylene oxide-2,4,7,9-tetramethyl-5-decyne-4,7-diol (trade name: Acetylenol, manufactured by KAWAKEN FINE CHEMICALS Co., Ltd.).

Alternatively, an ink without acetylenol (zero percent content) allows a less-permeable ink droplet that has the behavior of a top-loading type ink which will be defined later. If one percent of the acetylenol is mixed in ink, a high-permeable ink droplet can be obtained so that the ink droplet reaches to the interior of the printing medium 103 in a short time. If 0.35 percent of the acetylenol is mixed in ink, a semi-permeable ink droplet can be obtained and the permeability thereof is between the less- and high-permeable ink droplets.

TABLE 1

| | KA VALUE (ML/M2 · MSEC$^{1/2}$) | ACETYLENOL CONTENT (AC, %) | SURFACE TENSION (ST, DYNE/CM) |
|---|---|---|---|
| TOP-LOADING TYPE INK | KA < 1.0 | 0 ≦ AC < 0.2 | 40 ≦ ST |
| SEMI-PERMEABLE INK | 1.0 ≦ KA < 5.0 | 0.2 ≦ AC < 0.7 | 35 ≦ ST < 40 |
| HIGH-PERMEABLE INK | 5.0 ≦ KA | 0.7 ≦ AC | ST < 35 |

In the table, Ka value, acetylenol content (%), and surface tension (dyne/cm) for each of "top-loading ink", "semi-permeability ink", and "high-permeability ink" are listed. The permeability of each ink to a sheet of printing paper as a printing medium is increased as the Ka value is increased or as the surface tension is decreased.

The ink defined as "high-permeability ink" contains 0.7% or more of acetylenol corresponding to the range allowing the favorable results in the permeability. A reference value of the permeability of the ink of the present embodiment corresponds to the Ka value of the "top-loading type ink", i.e., preferably in the range of less than 1.0 (ml·m$^{-2}$·msec$^{-1/2}$), and more preferably in the range of less than 0.4 (ml·m$^{-2}$·msec$^{-1/2}$).

The ink of the present embodiment can be provided for forming an image on a printing medium by the use of a well-known ink-applying means. A preferable ink-applying method is a well-known ink jet printing method. It means that the ink of the present embodiment is used in the printing process in which the ink is ejected from a printing head to a printing medium to print an image. Well-known ink-ejecting technologies such as piezo type one can be adopted in the above printing head. In the preferred embodiment, however, an ink-ejecting technology used in the printing head is of ejecting ink by a pressure of an air-bubble generated in the ink.

The volume of ink provided on the printing medium after ejecting ink from the printing head is preferably less than 22 ml/$\mu$m$^2$ per unit area. To be more specific, it is preferably less than 100 pl for 360 dpi or 40 pl for 600 dpi. These volumes are less than that of the conventional ink because an area factor can be increased by widely permeating a dye which is simultaneously mixed with other constituents in ink of the present embodiment. On the other hand, the decrease in OD value is caused by an insufficient area factor, especially for normal paper when an ink containing pigment without dye is used as a color material.

The present invention allows another embodiment that further comprises an ink-storing container such as an ink cartridge in which a predetermined volume of the ink of the present invention is stored, and a printing head consisting of a removable combination of an ink-storing part and means for ejecting ink stored in that part.

The present invention further allows still another embodiment provided as an ink set. The ink set comprises at least two ink-storing parts being independent of each other. The first ink-storing part is for black ink with a self-dispersing type carbon black as its color material, and the second ink-storing part is for at least one color ink selected from other colors including yellow, magenta, and cyan inks.

A printing medium to be used in the present invention is not limited to a specific one, so that it can be selected from paper, cloth, nonwoven fabric, OHP sheet, leather, and so on. If the ink of the present invention is applied using an ink jet method on a printing medium on which a resin layer is formed as a top-coating layer, a "crack" defect of the image formed on the top-coating layer can be effectively avoided.

Figure 2B:
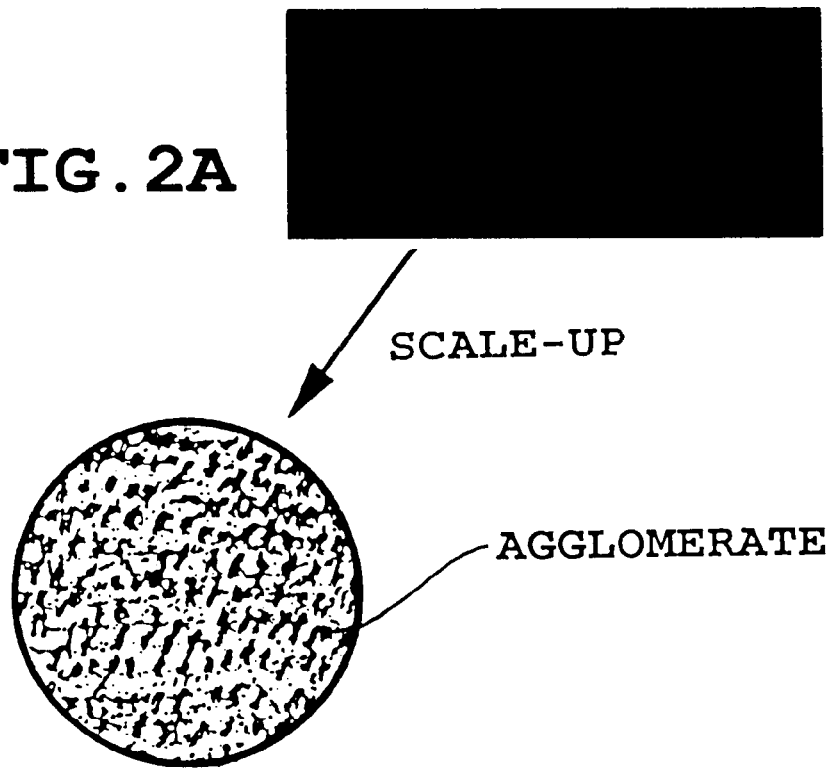

FIGS. 2A and 2B are schematic diagrams of a part of a dot image printed by using an ink of a first embodiment of the present invention. They show a solidly shaded area formed by printing at 100% duty and the scale up of a part of the solidly shaded area.

As shown in FIG. 2B, an agglomerate of pigment exists as fine particles enclosed with a dye when the printing is performed using the ink of the present invention, with the result that the dye spreads over an agglomerate-absence. As shown in the FIG. 2A, therefore, there is no "crack" defect as shown in FIG. 1. The present inventors assume that such a result may be derived from the fact that the ink of the present invention comprises a pigment without its dispersant and a dye.

In addition, it is also assumed that the strength of the agglomeration is reduced by the presence of the dye, and non-uniformity of the printed image can be resolved.

A printing medium having a resin layer as a top-coating layer may be a sheet of paper or a plastic film made of polyester or the like on which a resin layer is formed. Materials that constitute the top-coating layer may be a water-soluble resin, a water-dispersion resin, or the like as a principal constituent in addition to a cationic compound, a surface active agent, a filler, and so on as necessary.

The water-soluble resin may be selected from: polyvinyl alcohol and its denatured forms including anionic denatured polyvinyl alcohol, cationic denatured polyvinyl alcohol, and acetal denatured polyvinyl alcohol; water-type polyurethane; polyvinyl pyrrolidone; denatured polyvinyl pyrrolidone including copolymer of vinyl pyrrolidone and vinyl acetate, copolymer of vinyl pyrrolidone and dimethylaminoethyl methacryl acid, copolymer of quaternized vinyl pyloridone and dimethylaminoethyl methacryl acid, and copolymer of vinyl pyrolidone and methacrylamide propyl chlorotrimethylammonium; cellulosic water-soluble resins including carboxylmethyl cellulose, hydroxyethyl cellulose, and hydroxypropyl cellulose, and denatured celluloses including cationic hydroxyethyl cellulose; polyester, polyacrylic acid (ester), melamine resin, and their denatured products, synthetic resins such as graft copolymer containing at least polyester and polyurethane, and natural resins such as albumin, gelatin, casein, starch, cationic starch, gum arabic, and sodium alginate.

The water-dispersion resin may be selected from: polyvinyl acetate, ethylene/vinyl acetate copolymer, polystyrene, styrene/(meth) acrylate ester copolymer, (meth) acrylate ester polymer, vinyl acetate/(meth) acrylate (ester) copolymer, poly(meth) acrylamide, (meth)acrylamide copolymer, styrene/isoprene copolymer, styrene/butadiene copolymer, styrene/propylene copolymer, polyvinyl ether, silicon/acrylic copolymer, and so on, but is not limited to these compounds.

In addition to the above compounds, cationic compounds may be also used as materials for preparing the top-coating layer of the printing medium. Any cationic compounds may be useful if they have a cationic portion in their respective molecular structures, such as cationic surface active agents of the type such as quaternary ammonium salt, such as mono-alkyl ammonium chloride, di-alkyl ammonium chloride, tetra-methyl ammonium chloride, tri-methylphenyl ammonium chloride, ethylene-oxide addition ammonium chloride, or the like, or of the type such as amine salt, or an amphoteric surface active agent having a cationic portion of the type such as alkyl-betaine, imidazolium-betaine, alanine, or the like. For polymer or oligomer, a cationic modified compound of polyacrylamide, or copolymer of acrylamide and cationic monomer, polyarylamine, polyamine sulfone, polyvinylamine, polyethylene imine, polyamide epichlorohydrin resin, polyvinyl pyridinium halide, or the like. Furthermore, vinyloxazolidone monomer, or copolymer of vinyloxazolidone monomer and another typical monomer, or vinylimidazol monomer, or copolymer of vinylimidazol monomer and another typical monomer.

The above another typical monomer may be methacrylate, acrylate, acrylonitrile, vinylnitrile, vinylether, vinyl acetate, ethylene, styrene, or the like. It may be also cationic modified cellulose or the like.

The above cationic denatured compounds are preferable, but the present invention is not limited to the above listed compounds.

The thickness of the applied top-coating layer may be in the range of 0.1 $g/m^2$ to 100 $g/m^2$ in dry weight. Also, the top-coating layer may be of a multiple-layered structure, such as one-layered structure, two-layered structure, or three-layered structure.

A printing medium having the above top-coating layer has not only the advantage of especially preventing the "hairline crack" by the use of the ink of the present embodiment but also the advantage of complementing the disadvantages of the dye, such as poor wettability to the top-coating, because the pigment itself has a good wettability to the top-coating layer. Therefore, the ink of the present embodiment comprising both dye and pigment can prevent the occurrence of beading by using the ink containing dye alone as a color material.

Hereinafter, the present invention will be described as examples in a concrete manner.

EXAMPLE 1

Figure 3:
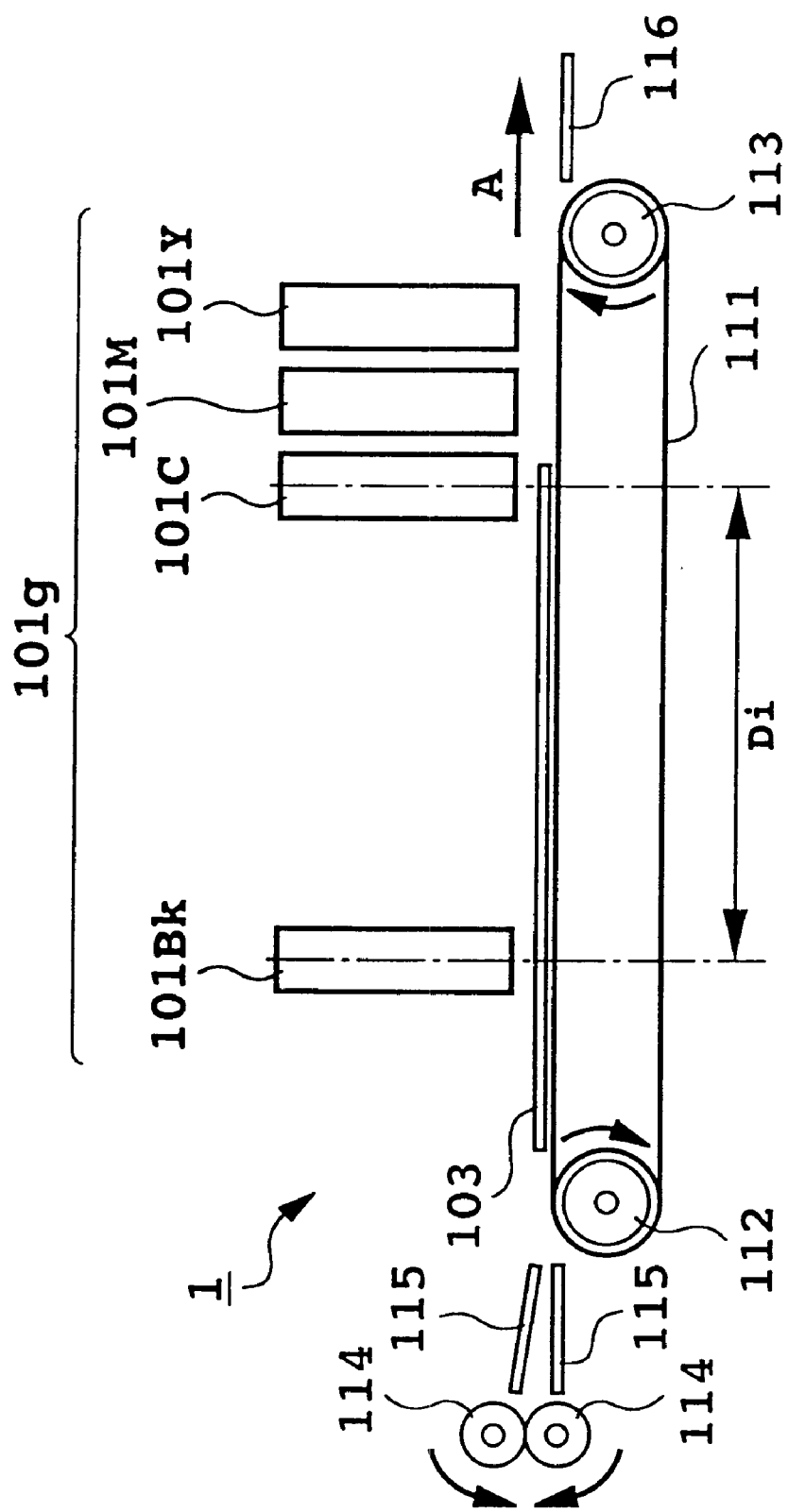
FIG. 3 is a schematic side view of an ink jet printing apparatus as one of the embodiments of the present invention.

FIG. 3 is a schematic side view of a full-line type ink jet printing apparatus as one of the embodiments of the present invention.

The printing apparatus 1 adopts an ink jet printing method where the printing operation is performed by ejecting ink from a plurality of full-line type print heads arranged in a predetermined position in the direction of transporting a recording medium as a printing medium (i.e., in the direction of the arrow A in the figure). The printing operation is controlled by a control circuit (not shown in the figure).

A head group 101g consists of print heads 101Bk, 101C, 101M, and 101Y. Each of these print heads has about 7,2000 ink outlets arranged in the direction of the width of the recording paper to be transported toward the A direction in the figure, allowing the printing on a sheet of A-3 sized paper at the maximum.

The recording paper 103 shifts its position in the direction of arrow A by the rotation of a pair of registration rollers 114 driven by a transport motor and then guided by a pair of guide boards 115 so as to be in register. After the registration of the paper, a transport belt 111 transports the paper. The transport belt 111 is an endless belt supported by two rollers 112 and 113. Here, the roller 113 is driven by a motor (not shown) or other driving means to transport the paper in the direction of arrow A. The paper is fixed on a surface of the transport belt through an electrostatic adsorptive activity. The print head group 101g performs their printing activities during the paper transport on the transport belt 111 and subsequently the printed paper 103 is discharged onto a paper cabinet 116.

Print heads of the print head group 101g are a head 101Bk that stores ink containing a black pigment(self-dispersing type carbon black) and a dye; and heads (cyan head 101C, magenta head 101M, and yellow head 101Y) that store respective color inks. Each of them is arranged in the direction of transporting the recording paper 103 as indicated by the arrow A in the figure. Therefore, black characters or letters and multiple color images can be printed by different color inks from the respective print heads.

In this example, ink outlets of each print head are arranged with the density of 600 dpi, so that it performs a printing behavior in the direction of transporting the recording paper at a dot density of 600 dpi. Thus, the dot density of an image or the like printed by the procedure of the present example is 600 dpi in both row and column directions. In addition, an ejection frequency of each print head is 4 KHz and an ejection volume of each print head is 15 pl per one ejection.

In the ink jet printing apparatus of the present example, as shown in FIG. 3, the distance Di between the black head 101Bk and the cyan head 101C is comparatively large to prevent a color mixture to be caused by ink bleeding at the boundary of a region printed by the black ink and a region printed by another color ink on the printing medium. If the printing apparatus uses only a printing medium on which a top-coating layer is formed, there is no need to consider the problem of ink bleeding. In this case, therefore, the distance Di can be decreased to allow the design of a smaller version of the printing apparatus.

The Bk ink to be used in the present example has the following composition. Hereinafter, the amount of each constituent is represented by "part by weight."

| Pigment-dispersing liquid I | 15 parts |
| C.I. Direct Black 195 | 2 parts |
| Glycerin | 6 parts |
| Diethylene glycol | 5 parts |
| Acetylenol EH | 0.1 parts |
| (Kawaken Fine Chemicals Co., Ltd.) | |
| Water | remainder |

The above pigment-dispersing liquid I is prepared by the following procedure.

300 g of acidic carbon black (trade name: MA-77, pH 3.0, available from Mitsubishi Kasei Co., Ltd.) is well mixed with 1,000 ml of water followed by dropping 450 g of sodium hypochlorite (effective chlorine concentration of 12%). The mixture is stirred for 10 hours at 100 to 105° C. The resulting slurry is filtrated through a filter paper (Toyo filter paper No. 2, available from Advantice Co., Ltd.). The resulting pigment particles are rinsed out with water to obtain a pigment wet cake. Then, the pigment wet cake is dispersed into 300 ml of water and then subjected to the step of demineralization up to an electric conductance of 0.2 µs by passing through a reverse osmosis membrane. Furthermore, the pigment-dispersing liquid (pH=8 to 10) is condensed to the pigment concentration of 10 weight %. Consequently, a pigment-dispersing liquid I is obtained. The liquid contains the dispersion of self-dispersing type carbon black where a hydrophilc —COO— group is directly bound on its surface to charge it anionically.

The Bk ink prepared by the above process has the Ka value of 0.35 $(ml \cdot m^{-2} \cdot msec^{-\frac{1}{2}})$.

EXAMPLE 2

The Bk ink to be used in the present example can be provided as another example having the following composition.

| Pigment-dispersing liquid 2 | 25 parts |
| C.I. Food Black 2 | 2 parts |
| Glycerin | 6 parts |
| Triethylene glycol | 5 parts |
| Acetylenol EH | 0.1 parts |
| (Kawaken Fine Chemicals Co., Ltd.) | |
| Water | remainder |

The above pigment-dispersing liquid 2 is prepared by the following procedure.

10 g of carbon black with the surface area of 230 m²/g and the DBP oil absorption volume of 70 ml/100 g, 3.41 g of p-amino-N-benzoic acid, and 72 g of water are well mixed together followed by dropping 1.62 g of sodium hypochlorite and stirred at 70° C. After few minutes, an aqueous solution obtained by solving 1.07 g of sodium hypochlorite in 5 g of water is added in the mixture and subsequently stirred for 1 hour. The resulting slurry is filtrated through a filter paper (Toyo filter paper No. 2, available from Advantice Co., Ltd.). The resulting pigment particles are rinsed out with water and then dried in an oven at 90° C. After that, an aqueous pigment solution (pigment particle concentration of 10 weight %) is obtained by adding an appropriate volume of water to the dried pigment particles. Consequently, a pigment-dispersing liquid I is obtained. The liquid contains the dispersion of self-dispersing type carbon black of the following chemical formula, where a hydrophilic group is bound on its surface through a phenyl group to charge it anionically.

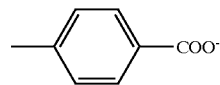

The Bk ink prepared by the above process has the Ka value of 0.35 $(ml \cdot m^{-2} \cdot msec^{-\frac{1}{2}})$.

EXAMPLE 3

The Bk ink to be used in the present example can be provided as another example having the following composition.

| Pigment-dispersing liquid 3 | 5 parts |
| C.I. Direct Black 168 | 3 parts |
| C.I. Direct Blue 199 | 0.5 parts |
| Glycerin | 6 parts |
| Diethylene glycol | 5 parts |
| Water | remainder |

The above pigment-dispersing liquid 3 is prepared by the following procedure.

1.58 g of anthranilic acid is added in an aqueous solution prepared by solving 5 g of concentrated hydrochloric acid in 5.3 g of water. Then, the mixture solution is stirred in an ice bath to keep it cool at 10° C. or less. During the period of stirring in the ice bath, another solution is prepared by adding 1.78 g of sodium hypochlorite in 8.7 g of water being cooled at 5° C. The resulting mixture is stirred for 15 minutes followed by the addition of 20 g of carbon black with the surface area of 320 m$^2$/g and the DBP oil absorption volume of 120 ml/100 g and subsequently is stirred for 15 minutes. The resulting slurry is filtrated through a filter paper (Toyo filter paper No. 2, available from Advantice Co., Ltd.). The resulting pigment particles are rinsed out with water and then dried in an oven at 110° C. After that, an aqueous pigment solution (pigment particle concentration of 10 weight %) is obtained by adding an appropriate volume of water to the dried pigment particles. Consequently, a pigment-dispersing liquid 3 is obtained. The liquid contains the dispersion of self-dispersing type carbon black of the following chemical formula, where a hydrophilic group is bound on its surface through a phenyl group to charge it anionically.

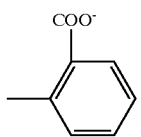

The Bk ink prepared by the above process has the Ka value of 0.25 (ml·m$^{-2}$·msec$^{-\frac{1}{2}}$).

Comparative Example 1

For making a comparison with Examples 1 to 3, an ink having the following constituents is prepared.

| | |
|---|---|
| Pigment dispersant 4 | 25 parts |
| C.I. Direct Black 168 | 2 parts |
| Ethylene glycol | 8 parts |
| Glycerin | 5 parts |
| Isopropylene glycol | 4 parts |
| Water | 56 parts |

The above pigment dispersant 4 is prepared by the following procedure.

14 parts of styrene/acrylic acid/ethylacrylate copolymer (acid number of 180, average molecular weight of 12,000), 4 parts of monoethanolamine, and 72 parts of water are mixed together and then heated at 70° C. in a water bath to dissolve a resin portion perfectly. It is noted that the resin is dissolved insufficiently if the concentration of resin to be dissolved is low. Thus, a comparatively high-concentration solution is previously prepared for the dissolution of the resin to obtain a resin solution with a desired concentration as a diluted solution. 10 parts of carbon black (trade name: MCF-88, pH 8.0, available from Mitsubishi Kasei Co., Ltd.) is added to the resulting solution and then pre-mixed for 30 minutes.

The conditions for preparing the pigment-dispersant 4 is as follows.

Dispersing machine: sand grinder (manufactured by Igarashi Kiki, Co., Ltd.)

Powdering medium: zirconia beads of 1 mm in diameter

Packing ratio of powdering medium: 50% (volume)

Powdering period: 3 hours

Centrifugation: 12,000 rpm for 20 minutes (Evaluations)

We conducted evaluations on inks obtained by Examples 1 to 3 and Comparative Example 1 by the use of the ink jet printing apparatus described in Example 1 to print a solidly shaded image of a predetermined size on a transparency film (trade name: CF102, available from CANON Kabushiki Kaisha) on which a top-coating layer is applied. We evaluated the quality of each of the images by the presence or absence of a "hairline crack" defect. As a result of the evaluation, any "hairline crack" defect cannot be observed when the ink is of any of Examples 1 to 3 except Comparative Example 1.

We also conducted evaluations on inks obtained by Examples 1 to 3 and Comparative Example 1 by the same way as described above except for the printing medium. In this case, we used a solidly shaded image of a predetermined size on a transparency film (trade name: CF101, available from CANON Kabushiki Kaisha) on which a top-coating layer is applied. We evaluated the quality of each of the images by the presence or absence of a "hairline crack" defect. As a result of the evaluation, any "hairline crack" defect cannot be observed when the ink is of any of Examples 1 to 3. Regarding the ink of Comparative Example 1, the "hairline crack" defect is observed more seriously.

We also conducted evaluations on inks obtained by Examples 1 to 3 and Comparative Example 1 by the same way as described above except for the printing medium. In this case, we used a solidly shaded image of a predetermined size on a sheet of normal paper (trade name: PB paper, available from CANON Kabushiki Kaisha). We evaluated the quality of each of the images. As a result of the evaluation, an image density of each ink of Examples 1 to 3 is remarkably increased and uniform compared with that of Conventional Example 1. Consequently, each ink of Examples 1 to 3 allows an extremely high image quality. Furthermore, a dot image on the normal paper formed by each of the inks of Examples 1 to 3 and Comparative Example 1 reveals that a diameter of the dot of Comparative Example 1 is smaller than that of each of Examples 1 to 3 and also the image concentration of the former is lighter than that of the latter.

EXAMPLE 4

Preparation of Ink

A Bk ink having the following constituents is prepared.

| | |
|---|---|
| Pigment dispersant | 15 parts by weight |
| C.I. Food Black 2 | 1 part by weight |
| Ethylene glycol | 12 parts by weight |
| Glycerin | 10 parts by weight |
| Ethanol | 6 parts by weight |
| Water | 56 parts by weight |

The above pigment dispersant contains a 20 weight % dispersion of a self-dispersing type carbon black (average particle size of 130 nm) having a sulfone group and is available from Cabot Co., Ltd. as the trade name of CAB-O-JET 200. Subsequently, the above constituents are mixed together and stirred for 12 hours by a stirrer to obtain an ink of Example 4. The resulting ink has the Ka value of 0.36 (ml·m$^{-2}$·msec$^{-\frac{1}{2}}$).

(Evaluations)

For evaluating the above ink, a printing medium having a resin layer obtained by the following procedure is prepared.

45 parts of water are added to 5 parts of polyvinyl alcohol used as a binder. Then, the mixture is further mixed with 50 parts of latex containing a thermoplastic resin (polyolefin resin particles (Tg=94° C., average particle size=0.5 μm, trade name: Chemipearl S-300, Mitsui Sekyu Kagaku Co., Ltd.)) to prepare a coating solution. The resulting coating solution is applied on a surface of a transparency film CF-301 available from CANON Kabushiki Kaisha so as to have the solid content of 5 g/m² (about 5 μm in thickness). Subsequently, the resulting top-coat is dried at 70° C. to finish a printing medium with a thermal plastic resin particle layer as a top-coating layer on an ink-receiving layer to be used in the present invention.

We conducted evaluations on inks obtained by Example 4. That is, the Bk ink of this example is used in the process of forming a dot image by an ink jet printer (trade name: BJC-400J, available from CANON Kabushiki Kaisha). As a result of visual checking on the dot image, there is no difference between the center and the peripheral portion of the dot in image density.

We also conducted the same evaluations on normal paper (trade name: PB paper, available from CANON Kabushiki Kaisha) and make visual check on the dot image. The dot image has a high concentration thereof. Also, we could not find uneven concentrated area on the center and the peripheral portions of the dot. Furthermore, we could not find feathering or the like in the dot image.

EXAMPLE 5

Preparation of Ink

A Bk ink is prepared by the same way as that of Example 4 except for the following.

| | |
|---|---|
| Pigment dispersant 6 | 3 parts by weight |
| C.I. Food Black 2 | 1.2 part by weight |
| Diethylene glycol | 7 parts by weight |
| Glycerin | 9 parts by weight |
| Isopropyl alcohol | 5 parts by weight |
| Water | 74.8 parts by weight |

The above pigment dispersant containing 15 weight % dispersion of a self-dispersing type carbon black (average particle size of 150 nm) having a carboxyl group is available from Cabot Co., Ltd. as the trade name of CAB-O-JET 300. Subsequently, the above constituents are mixed together and stirred for 12 hours by a stirrer to obtain an ink of Example 5. The resulting ink has the Ka value of 0.38 (ml·m$^{-2}$·msec$^{-\frac{1}{2}}$).

(Evaluations)

For evaluating the above ink, a printing medium having a resin layer obtained by the following procedure was prepared.

A printing medium was prepared by the same way as that of Example 4 except a thermoplastic resin (polyolefin resin particles (Tg=115° C., average particle size=3 μm, trade name: Chemipearl W-100, Mitsui Sekyu Kagaku Co., Ltd.)) was used.

We conducted evaluations on inks obtained by Example 5 by the same way as that of Example 4. As a result of visual checking on the dot image, there is no difference between the center and the peripheral portion of the dot in image density. We also conducted the same evaluations on normal paper (trade name: PB paper, available from CANON Kabushiki Kaisha) and made a visual check on the dot image. The dot image has a high concentration thereof. Also, we could not find uneven concentrated area on the center and the peripheral portions of the dot. Furthermore, we could not find feathering or the like in the dot image.

(Other Examples)

Figure 4:
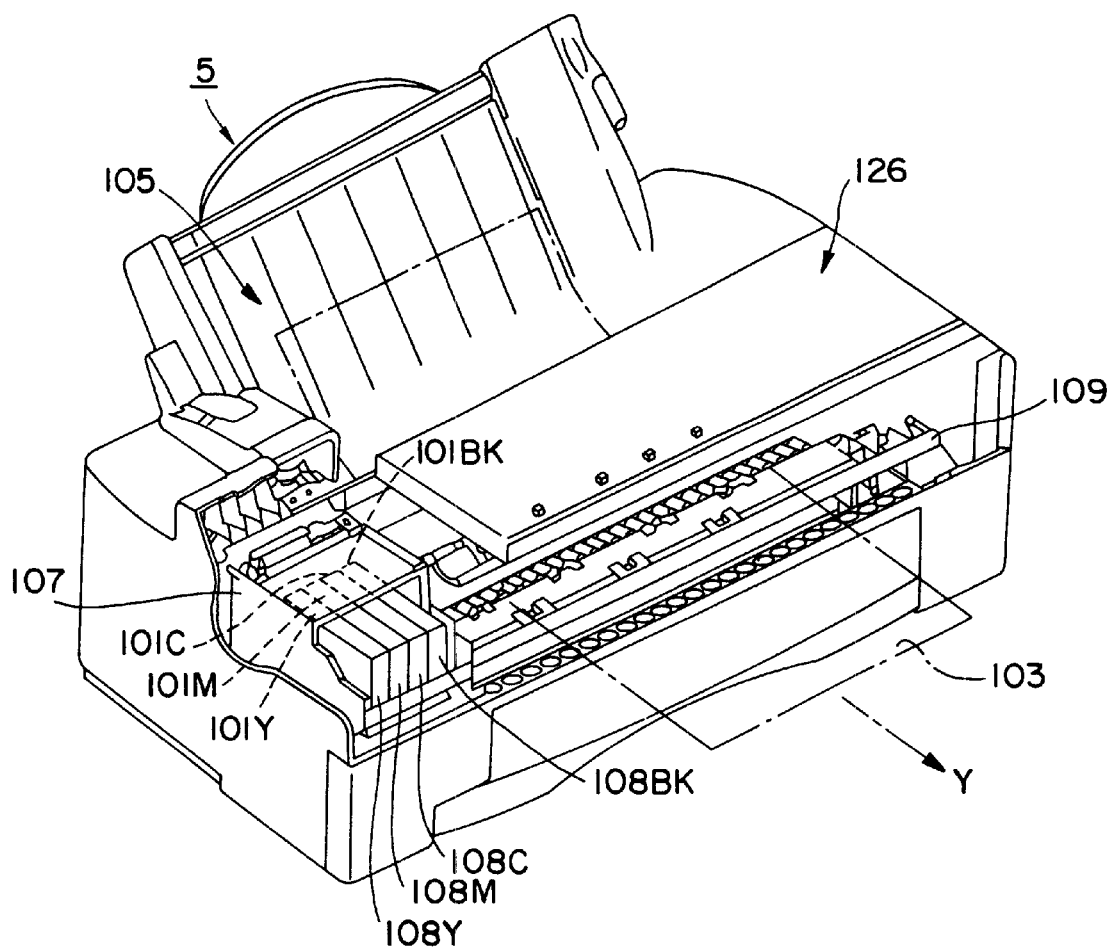
FIG. 4 is a schematic perspective view of an ink jet printer as another embodiment of the present invention.

FIG. 4 is a serial type printing apparatus as another apparatus 5 capable of using the ink of one of the examples described above.

In this figure, the same structural members are respectively referenced by the same numbers to omit the detailed description thereof.

A printing paper 103 as a printing medium is provided to the printing apparatus from a sheet-feeding portion 105 and then discharged from the apparatus after passing through a printing portion 126. In the printing portion 126, printing heads 101Bk, 101C, 101M, and 101Y are mounted on a carriage 107, which moves back and forth along a guide rail 109 by a driving force of a motor (not shown). The printing head 101Bk ejects black ink prepared according to the present invention, while the printing heads 101C, 101M, and 101Y eject cyan ink, magenta ink, and yellow ink, respectively. These printing heads are driven so that the printing medium 103 receives these inks in that order.

The printing heads 101Bk, 101C, 101M, and 101Y receive their respective inks from ink containers 108BK, 108C, 108M, and 108Y, respectively. The printing head has a plurality of ink-discharging ports. For discharging an ink droplet from the printing head, a driving signal is provided on a thermoelectric converter (i.e., heater) formed on an ink-passage adjacent to an ink-discharging port (i.e., orifice) of the printing head to generate an air bubble by the action of heat and simultaneously the air bubble exerts pressure on the ink, resulting in the discharge of ink from the orifice by the use of the pressure. In this example, by the way, each printing head has 64 orifices at a density of 360 dpi in the direction perpendicular to a scanning direction of the printing head. In the example, furthermore, each of the orifices ejects 23 pl of ink for one droplet.

In the above configuration of printing heads, the distance between the printing heads adjacent to each other is ½ inch, such as the distance between the printing heads 101Bk and 101C, and a print density in the scanning direction is 720 dpi and a discharge frequency of each head is 7.2 KHz.

Figure 5:
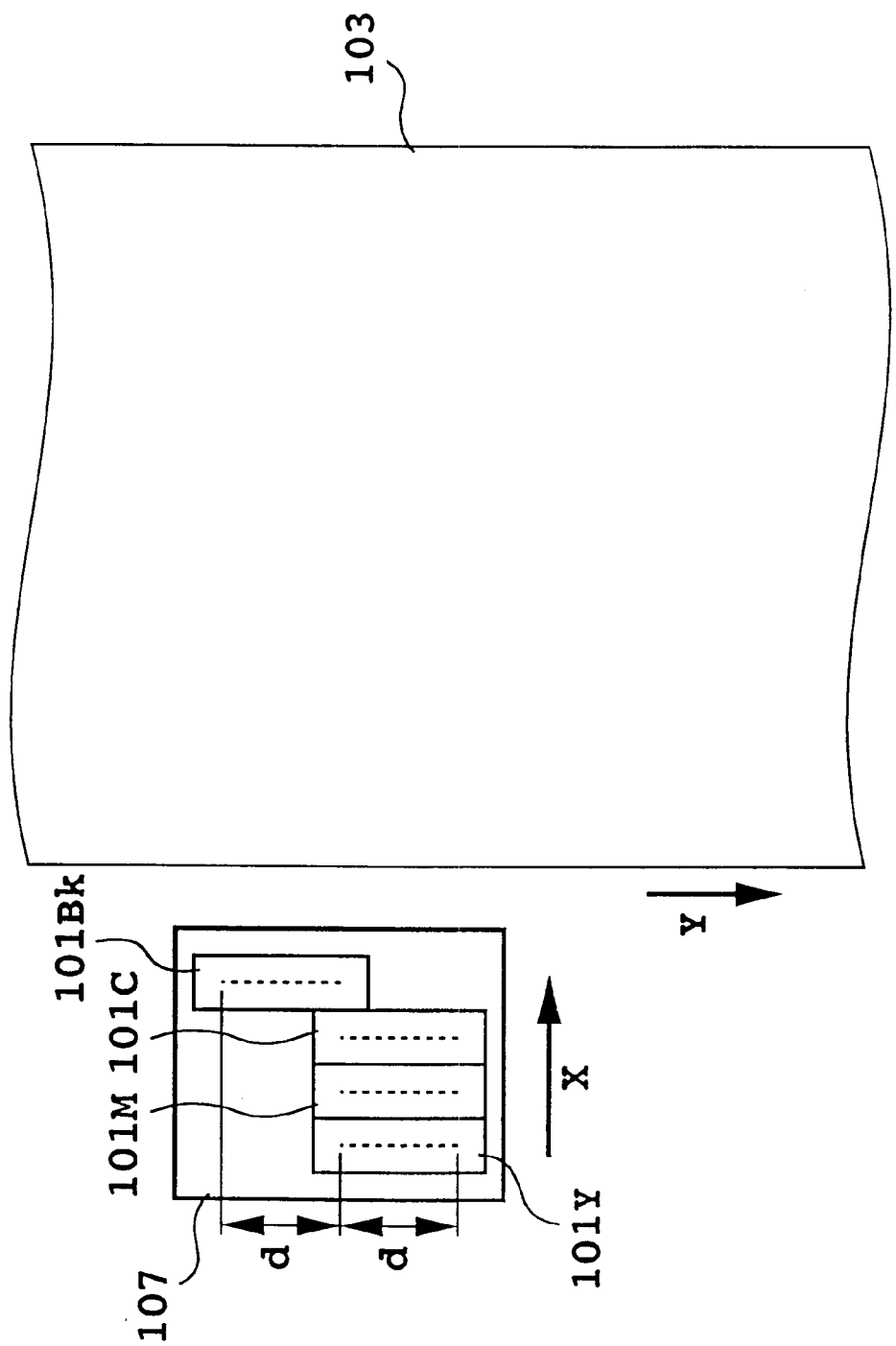
FIG. 5 is a schematic diagram for illustrating a printing operation by the printer shown in FIG. 4.

FIG. 5 is a schematic view of the top of the printing portion 126 for illustrating the process of printing using the serial printing apparatus shown in FIG. 4.

In FIG. 5, the carriage 107 moves back and forth alternately in the direction (hereinafter, referred to as the X-direction) perpendicular to the direction (hereinafter, referred to as the Y-direction) of transporting the recording medium 103. Orifices (represented by dots in the figure) of color-ink discharging portion consisting of the printing heads 101C, 101M, and 101Y are open in the direction of ejecting ink onto the printing medium 103.

In each printing head, orifices are arranged so as to perform printing with a width of "d" in the Y direction of the recording paper 103 by one scanning movement. For making a time difference between the ink ejection by the Bk-printing head and the ink ejection by the color-printing heads, the Bk-printing head is arranged at a position some distance from the color-printing heads in the direction of transporting the printing medium. Such a time difference corresponds to the time elapsed for the substantial completion of the Bk ink sinking into a predetermined area of the recording paper (i.e., the penetration of the Bk ink in the direction along a thickness of the recording paper).

By configuring the components as described above, the Bk-ink ejection and the color-ink ejection are performed with a predetermined time lag corresponding to a time of one scanning movement of the carriage 107.

Figure 6:
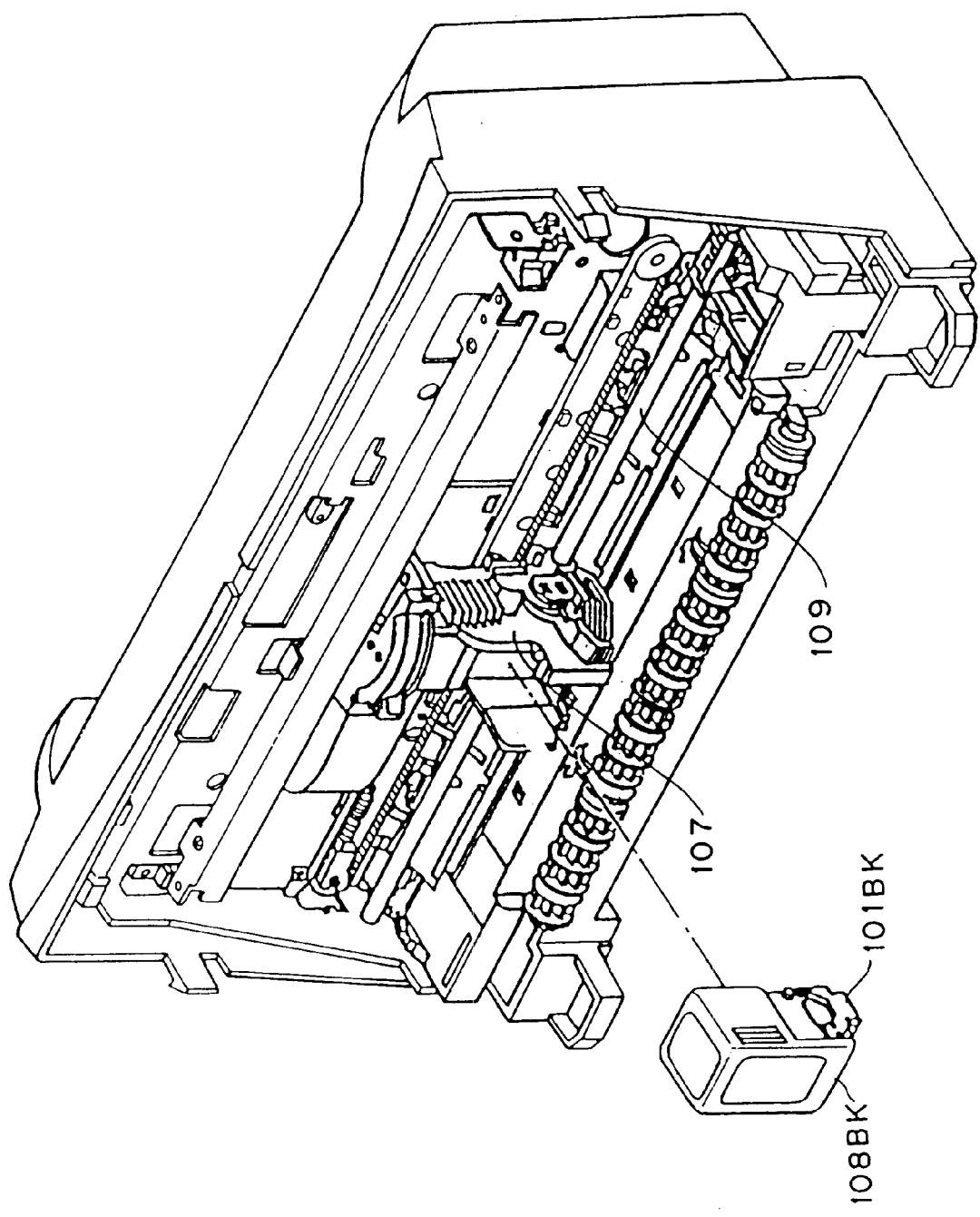
FIG. 6 is a schematic perspective view of an ink jet printer as still another embodiment of the present invention.
Figure 7A:
Figure 7B:
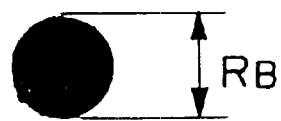
Figure 7C:
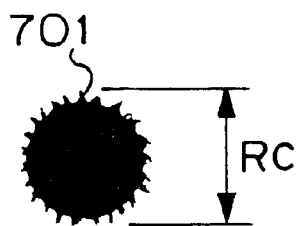
Figure 7D:
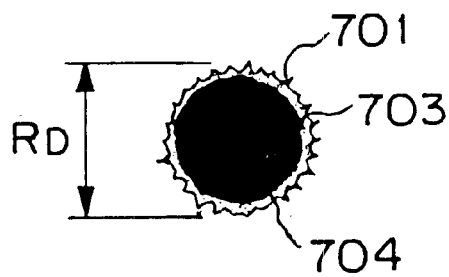
Figure 7E:
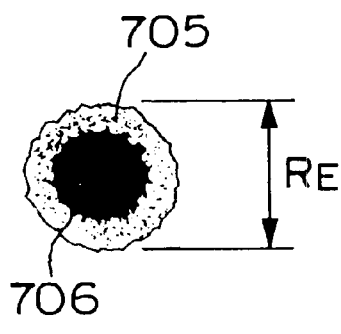
Figure 7F:
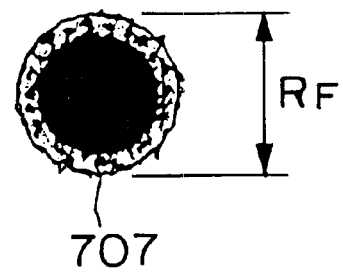
Figure 7G:
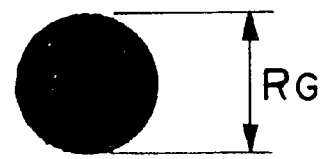

FIG. 6 is a perspective view of an ink jet recording printer as another embodiment of the present invention, in which the reference numerals denote the same structural components as those of FIG. 3 and FIG. 4 so that the detailed description thereof will be omitted.

As shown in FIG. 6, the ink involved in the embodiments of the present invention can be used as a black ink for a mono color printer.

Accordingly, as described above, an ink of the present invention comprises self-dispersing pigments and dyes. The cohesive force of the pigments itself is not strong. However, the dyes make up for the loss of the cohesive force, so that an agglomerate of the pigments becomes fine particles. Thus, the dyes surround the fine pigment particles, resulting in the prevention of defects such as unevenly-printed images as a whole.

Therefore, the present invention allows a high-quality printing without causing defects such as unevenly-printed images and "hairline cracks".

In the present specification, "part(s)" and "percent(s)" or "%" are "by weight" unless otherwise specified.

The present invention has been described in detail with respect to preferred embodiments, and it will now be apparent from the foregoing to those skilled in the art that changes and modifications may be made without departing from the invention in its broader aspect, and the appended claims are intended to cover all such changes and modifications as fall within the true spirit of the invention.

What is claimed is:

1. An aqueous ink, comprising:
   an anionic dye;
   a self-dispersant pigment having an anionic group bonded directly or through an atomic group to a surface of the pigment; and
   at least two kinds of organic solvents,
      wherein the ink has a Ka value of less than 1 ml·m$^{-2}$·msec$^{-1/2}$ according to the Bristow method, and
      wherein the ink is free from any dispersants for the pigments.

2. The ink as claimed in claim 1, wherein the anionic group is selected from the group consisting of —COOM, —SO$_3$M, —PO$_3$HM, —PO$_3$M$_2$, —SO$_2$NH$_2$, —SO$_2$NHCOR,
   wherein M is a hydrogen atom, an alkali metal, an ammonium, or an organic ammonium, R is an alkyl group having 1 to 12 carbon atoms, a substituted or unsubstituted phenyl group or a substituted or unsubstituted naphthyl group.

3. The ink as claimed in claim 1, wherein the atomic group is selected from the group consisting of a substituted or unsubstituted alkylene group having 1 to 12 carbon atoms, a substituted or unsubstituted phenylene group, and a substituted or unsubstituted naphthylene group.

4. The ink as claimed in claim 1, wherein 80% or more of the pigment has a diameter in a range from 0.05 to 0.3 μm.

5. The ink as claimed in claim 4, wherein 80% or more of the pigment has a diameter in a range from 0.1 to 0.25 μm.

6. The ink as claimed in claim 1, wherein the dye is at least one of an acidic dye, a direct dye and a reactive dye.

7. The ink as claimed in claim 1, wherein the dye is at least one of a disazo dye and a trisazo dye.

8. The ink as claimed in claim 1, wherein the ink contains at least two kinds of dyes whose structures are different from each other.

9. The ink as claimed in claim 1, wherein the ratio of the dye and the pigment in the ink is in a range from 5:95 to 95:5.

10. The ink as claimed in claim 1, wherein the pigment is a carbon black.

11. An aqueous ink for use in an ink-jet image forming process, the ink being ejected from an orifice by an ink jet ejecting process, and the ink comprising:
    an anionic dye;
    a self-dispersant pigment having an anionic group bonded directly or through an atomic group to a surface of the pigment; and
    at least two kinds of organic solvents,
       wherein the ink has a Ka value of less than 1 ml·m$^{-2}$·msec$^{-1/2}$ according to the Bristow method, and
       wherein the ink is free from any dispersants for the pigments.

12. The ink as claimed in claim 11, wherein the anionic group is selected from the group consisting of —COOM, —SO$_3$M, —PO$_3$HM, —PO$_3$M$_2$, —SO$_2$NH$_2$, —SO$_2$NHCOR,
    wherein M is a hydrogen atom, an alkali metal, an ammonium, or an organic ammonium; R is an alkyl group having 1 to 12 carbon atoms, a substituted or unsubstituted phenyl group or a substituted or unsubstituted naphthyl group.

13. The ink as claimed in claim 11, wherein the atomic group is selected from the group consisting of a substituted or unsubstituted alkylene group having 1 to 12 carbon atoms, a substituted or unsubstituted phenylene group, and a substituted or unsubstituted naphthylene group.

14. The ink as claimed in claim 11, wherein 80% or more of the pigment has a diameter in a range from 0.05 to 0.3 μm.

15. The ink as claimed in claim 14, wherein 80% or more of the pigment has a diameter in a range from 0.1 to 0.25 μm.

16. The ink as claimed in claim 11, wherein the dye is at least one of an acidic dye, a direct dye and a reactive dye.

17. The ink as claimed in claim 11, wherein the dye is at least one of a disazo dye and a trisazo dye.

18. The ink as claimed in claim 11, wherein the ink contains at least two kinds of dyes whose structures are different from each other.

19. The ink as claimed in claim 11, wherein the ratio of the dye and the pigment in the ink is in a range from 5:95 to 95:5.

20. The ink as claimed in claim 11, wherein the pigment is a carbon black.

21. An ink-jet printing process comprising the steps of:
    i) ejecting an aqueous ink by an ink jet recording process; and
    ii) applying the aqueous ink on a printing medium,
    wherein the aqueous ink comprises:
       an anionic dye;
       a self-dispersant pigment having an anionic group bonded directly or through an atomic group to a surface of the pigment; and
       at least two kinds of organic solvents,
    wherein the ink has a Ka value of less than 1 ml·m$^{-2}$·msec$^{-1/2}$ according to the Bristow method, and
    wherein the ink is free from any dispersants for the pigments.

22. The ink-jet printing process as claimed in claim 21, wherein step i) comprises the substeps of:
    applying thermal energy to the ink; and
    ejecting the ink from an orifice towards the printing medium.

23. The ink jet printing process as claimed in claim 21, wherein the anionic group is selected from the group consisting of —COOM, —SO$_3$M, —PO$_3$HM, —PO$_3$M$_2$, —SO$_2$NH$_2$, —SO$_2$NHCOR,
    wherein M is a hydrogen atom, an alkali metal, an ammonium, or an organic ammonium; R is an alkyl group having 1 to 12 carbon atoms, a substituted or unsubstituted phenyl group or a substituted or unsubstituted naphthyl group.

24. The ink-jet printing process as claimed in claim 21, wherein the atomic group is selected from the group consisting of a substituted or unsubstituted alkylene group having 1 to 12 carbon atoms, a substituted or unsubstituted phenylene group, and a substituted or unsubstituted naphthylene group.

25. The ink-jet printing process as claimed in claim 21, wherein 80% or more of the pigment has a diameter in a range from 0.05 to 0.3 μm.

26. The ink jet printing process as claimed in claim 25, wherein 80% or more of the pigment has a diameter in a range from 0.1 to 0.25 μm.

27. The ink jet printing process as claimed in claim 21, wherein the dye is at least one of an acidic dye, a direct dye and a reactive dye.

28. The ink jet printing process as claimed in claim 21, wherein the dye is at least one of a disazo dye and a trisazo dye.

29. The ink jet printing process as claimed in claim 21, wherein the ink contains at least two kinds of dyes whose structures are different from each other.

30. The ink jet printing process as claimed in claim 21, wherein the ratio of the dye and the pigment in the ink is in a range from 5:95 to 95:5.

31. The ink jet printing process as claimed in claim 21, wherein the pigment is a carbon black.

32. An ink jet printing process comprising the steps of:
i) ejecting an aqueous ink towards a coated layer containing a resin by an ink jet ejecting process, the coated layer constituting an outer surface of a printing medium; and
ii) forming an image on the outer surface of the printing medium,
wherein the aqueous ink comprises:
an anionic dye;
a self-dispersant pigment having an anionic group bonded directly or through an atomic group to a surface of the pigment; and
at least two kinds of organic solvents,
wherein the ink has a Ka value of less than 1 ml·m$^{-2}$·msec$^{-1/2}$ according to the Bristow method, and
wherein the ink is free from any dispersants for the pigments.

33. The ink-jet printing process as claimed in claim 32, wherein step i) comprises the substeps of:
applying thermal energy to the ink; and
ejecting the ink from an orifice towards the printing medium.

34. The ink-jet printing process as claimed in claim 32, wherein the anionic group is selected from the group consisting of —COOM, —SO$_3$M, —PO$_3$HM, —PO$_3$M$_2$, —SO$_2$NH$_2$, —SO$_2$NHCOR,
wherein M is a hydrogen atom, an alkali metal, an ammonium, or an organic ammonium; R is an alkyl group having 1 to 12 carbon atoms, a substituted or unsubstituted phenyl group or a substituted or unsubstituted naphthyl group.

35. The ink-jet printing process as claimed in claim 32, wherein the atomic group is selected from the group consisting of a substituted or unsubstituted alkylene group having 1 to 12 carbon atoms, a substituted or unsubstituted phenylene group, and a substituted or unsubstituted naphthylene group.

36. The ink-jet printing process as claimed in claim 32, wherein 80% or more of the pigment has a diameter in a range from 0.05 to 0.3 μm.

37. The ink-jet printing process as claimed in claim 36, wherein 80% or more of the pigment has a diameter in a range from 0.1 to 0.25 μm.

38. The ink-jet printing process as claimed in claim 32, wherein the dye is at least one of an acidic dye, a direct dye and a reactive dye.

39. The ink-jet printing process as claimed in claim 32, wherein the dye is at least one of a disazo dye and a trisazo dye.

40. The ink-jet printing process as claimed in claim 32, wherein the ink contains at least two kinds of dyes whose structures are different from each other.

41. The ink-jet printing process as claimed in claim 32, wherein the ratio of the dye and the pigment in the ink is in a range from 5:95 to 95:5.

42. The ink-jet printing process as claimed in claim 32, wherein the pigment is a carbon black.

43. The ink-jet printing process as claimed in claim 32, wherein the coated layer comprises a water-soluble resin or a water-dispersible resin.

44. The ink-jet printing process as claimed in claim 43, wherein the water-soluble resin is selected from the group consisting of polyvinyl alcohol, anionic modified polyvinyl alcohol, cationic modified polyvinyl alcohol, acetal-modified polyvinyl alcohol, polyurethane, polyvinylpyrrolidone, copolymers of polyvinylpyrrolidone and vinyl acetate, copolymers of vinylpyrrolidone and dimethylaminoethylmethacrylate, copolymers of quatenarized vinyl pyrrolidone and dimethylaminoethyl-methacrylic acid, copolymers of vinylpyrrolidone and methacrylaminoethyl methacrylic acid, copolymers of vinylpyrrolidone and methacrylamidepropyltrimethyl ammonium chloride, carboxymethyl cellulose, hydroxyethyl cellulose, hydroxypropyl cellulose, cationic hydroxyethyl cellulose, polyester, polyacrylic acid ester, melamine resin, graft copolymers of polyurethane and polyester, albumin, gelatin, casein, starch, cationic starch, gum arabic and sodium alginate.

45. The ink-jet printing process as claimed in claim 43, wherein the water-dispersible resin is a compound selected from the group consisting of polyvinyl acetate, ethylene-vinyl acetate copolymers, polystyrene, styrene-acrylate copolymers, styrene-methacrylate copolymers, acrylic acid ester copolymers, methacrylic acid ester copolymers, vinyl acetate-acrylic acid copolymers, vinyl acetate-methacrylic acid copolymers, vinyl acetate-acrylic acid ester copolymers, vinyl acetate-methacrylic acid ester copolymers, polyacrylamide, acrylamide copolymers, methacrylamide copolymers, styrene-isoprene copolymers, polyvinyl ether and silicone-acrylic copolymers.

46. An ink tank containing an aqueous ink, wherein the aqueous ink comprises:
an anionic dye;
a self-dispersant pigment having an anionic group bonded directly or through an atomic group to a surface of the pigment; and
at least two kinds of organic solvents,
wherein the ink has a Ka value of less than 1 ml·m$^{-2}$·msec$^{-1/2}$ according to the Bristow method, and
wherein the ink is free from any dispersants for the pigments.

47. An ink set comprising an aqueous black ink, and at least one aqueous color ink selected from the group consisting of a yellow ink, a magenta ink, and a cyan ink, wherein the aqueous black ink comprises:
an anionic dye;
a self-dispersant carbon black having an anionic group bonded directly or through an atomic group to a surface of the carbon black; and
at least two kinds of organic solvents,
wherein the ink has a Ka value of less than 1 ml·m$^{-2}$·msec$^{-1/2}$ according to the Bristow method, and
wherein the ink is free from any dispersants for the pigments.

48. An ink jet recording apparatus comprising four ink containers, each of which contains an aqueous black ink, a yellow ink, a magenta ink, and a cyan ink, and means for ejecting the respective inks independently by an ink jet ejecting process,
wherein the aqueous black ink comprises:
an anionic dye;
a self-dispersant carbon black having an anionic group bonded directly or through an atomic group to a surface of the carbon black; and
at least two kinds of organic solvents,
wherein the ink has a Ka value of less than 1 ml·m$^{-2}$·msec$^{-1/2}$ according to the Bristow method, and
wherein the ink is free from any dispersants for the pigments.

* * * * *

UNITED STATES PATENT AND TRADEMARK OFFICE
CERTIFICATE OF CORRECTION

PATENT NO. : 6,471,757 B1
DATED : October 29, 2002
INVENTOR(S) : Koitabashi et al.

It is certified that error appears in the above-identified patent and that said Letters Patent is hereby corrected as shown below:

Column 1,
Line 54, "types" should read -- type --; and
Line 61, "remained" should read -- remain --.

Column 4,
Line 26, "Ka" should read -- a Ka --.

Column 5,
Lines 29 and 45, "$_2 \cdot msec^{-½}$" should read -- $^2 \cdot msec^{-½}$ --.

Column 7,
Line 19, "comprising" should read -- comprises --.

Column 8,
Line 15, "the" should read -- one --.

Column 9,
Line 67, "ink" should read -- ink, --.

Column 11,
Line 42, "pyloridone" should read -- pyrrolidone --; and
Line 43, "pyrolidone" should read -- pyrrolidone --.

Column 12,
Line 64, "rollers" should read -- rollers, --.

Column 13,
Line 66, "hydrophilc" should read -- hydrophilic --.

Column 17,
Line 65, "apparatus" should read -- apparatus 5 --.

UNITED STATES PATENT AND TRADEMARK OFFICE
CERTIFICATE OF CORRECTION

PATENT NO.  : 6,471,757 B1
DATED       : October 29, 2002
INVENTOR(S) : Koitabashi et al.

It is certified that error appears in the above-identified patent and that said Letters Patent is hereby corrected as shown below:

Column 18,
Lines 8 and 16, "101Bk," should read -- 101BK, --; and
Line 33, "101Bk" should read -- 101BK --.

Column 22,
Line 62, "$_2 \cdot msec^{-½}$" should read -- $^2 \cdot msec^{-½}$ --.

Signed and Sealed this

Twenty-sixth Day of August, 2003

JAMES E. ROGAN
*Director of the United States Patent and Trademark Office*